United States Patent [19]

Sugimoto

[11] 3,744,330
[45] July 10, 1973

[54] GEARWHEEL ADAPTED TO DRIVE A POSITIVE MOTION BELT HAVING ELASTIC TEETH
[75] Inventor: Yoshiaki Sugimoto, Tokorozawa, Japan
[73] Assignee: Tsubakimoto Chain Co., Ltd., Joto-ku, Osaka-shi, Japan
[22] Filed: Apr. 5, 1972
[21] Appl. No.: 241,249

[30] Foreign Application Priority Data
Apr. 5, 1971   Japan.............................. 46/20932

[52] U.S. Cl................. 74/243 R, 74/231 C, 74/462
[51] Int. Cl...... F16h 55/30, F16g 1/28, F16h 55/06
[58] Field of Search.................. 74/231 C, 237, 462, 74/243 R

[56] References Cited
UNITED STATES PATENTS
2,182,461  12/1939  Yeakel............................ 74/231 C
2,507,852   5/1950  Case .................................... 74/237
3,404,576  10/1968  Cicognani et al................. 74/462 X Primary Examiner—Leonard H. Gerin
Attorney—Woodhams, Blanchard & Flynn

[57] ABSTRACT

A gear wheel is provided for engaging a positive motion belt in a power transmission device. The positive motion belt has elastic rectilinear teeth. The gear wheel is generated by a rectilinearly toothed gear cutter which has a cavity form having a pressure angle Φ, an effective cavity thickness L and a depth H of the following values when the pressure angle and effective thickness and height of the tooth on said belt are $\phi$, $l$ and $h$, respectively:

$$\Phi = \phi - (0.3° \sim 5°)$$
$$L = (1.01 \sim 1.08)l$$
$$H = (1.05 \sim 1.15)h$$

A gear wheel generated in this manner lengthens the life of the belt, reduces the noise and reduces the manufacturing cost of the gear wheel.

2 Claims, 8 Drawing Figures

Patented July 10, 1973

GEARWHEEL ADAPTED TO DRIVE A POSITIVE MOTION BELT HAVING ELASTIC TEETH

This invention relates to an improvement of the cavity form of a gearwheel adapted to drivingly engage a positive motion belt having elastic teeth, such as a V-type timing belt.

The invention has as its objects:
1. to provide a gearwheel which can lengthen the life of the belt,
2. to provide a gearwheel which can reduce the noise such as the explosion sound caused by air movement during the engagement and disengagement of the teeth when the gearwheel is in motion, and
3. to provide a gearwheel which can be manufactured at a low cost.

The appended drawings illustrate a preferred embodiment of this invention in which.

DETAILED DESCRIPTION

Figure 1:
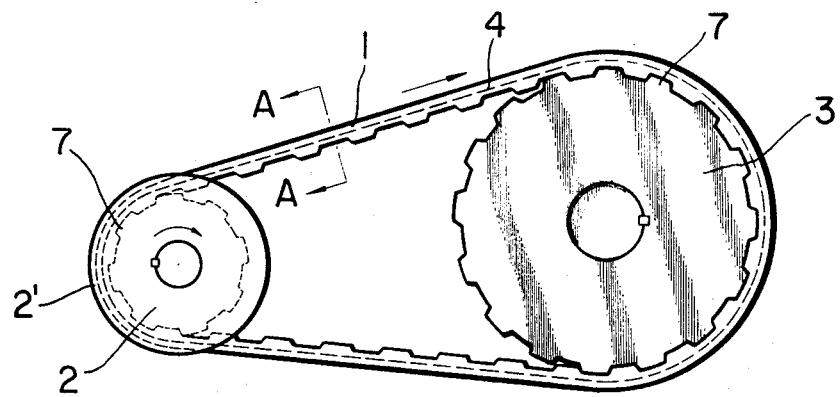
FIG. 1 is a side view showing a power transmission device with a positive motion belt having elastic teeth.
Figure 2:
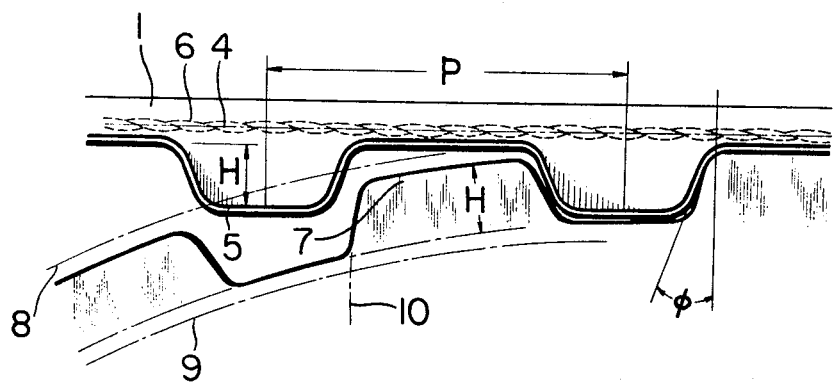
FIG. 2 is an enlarged view of a part of FIG. 1.
Figure 3:
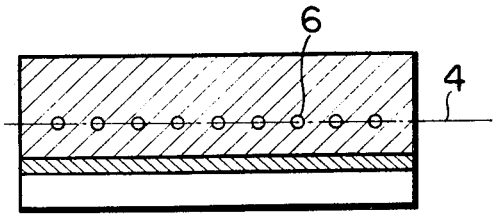
FIG. 3 is a cross-sectional view taken along the line A—A of FIG. 1.

Referring to the drawings, there is shown in FIG. 1 a positive motion, belt-type, power transmission device comprising a toothed flexible belt 1, such as a V-type timing belt, and spur gears 2 and 3 engaged therewith. The gears 2 and 3 are designed to effect the transmission of rotational forces to and from the belt, without slipping, between two or more axes, as in the relationship between a rack and pinion. The smaller spur gear 2 has a guide flange 2' for keeping the flexible belt 1 engaged with the gear.

This positive, toothed-belt, power transmission device, like the well-known transmission system made up of a flat belt and a pulley, has the advantage that a quiet high-speed power transmission can be achieved without requiring lubrication. The toothed-belt system is free from a drawback of the flat-belt system, namely, the relative slipping that occurs between the belt and pulley thereby resulting in a lack of certainty in transmitting a high torque or in working against a percussive variation in the applied torque.

The following is a description about a conventional belt and gearwheel in a known positive, toothed-belt, power transmission device.

Each tooth on the belt 1 is made of an elastic material such as rubber or plastic, and has a trapezoidal rectilinear tooth form with a pressure angle $\phi$ or a total addendum tooth form which extends outwardly from the belt only on one side with respect to the pitch line 4, that is, in the direction of the addendum alone. This belt has a fabric, wear-resisting covering 5 on its inner surface for covering the teeth. A flexible reinforcing member 6 is provided along the pitch line 4, which reinforcing member is made of fibers or other form of metallic or non-metallic material and serves to give a sufficient tensile strength to the belt. The belt also has a back or outer part made of an elastic material, such as rubber or plastic, which is integrally connected to the flexible reinforcing member.

On the other hand, the form of the cavities and thereby the teeth 7 on the gears for engaging said belt is determined mechanically, in the same manner as the relationship between a rack and pinion is determined. A cavity form and thereby a tooth form which permits the teeth of the pinion to make a smooth engagement, with no interference and with an engagement clearance, with the rectilinearly toothed rack is, of course, an involute curve derived from a base circle (Diameter $D_g = D_p \cos\phi$) which is obtained by multiplying the diameter of the pinion pitch $D_p$ by the cosine of the pressure angle $\phi$ of the rack. That is, such a tooth and/or cavity form is determined by the involute curve 10 derived from the base circle 9 whose diameter $D_g$ is equal to $D_p \cos\phi$ which is obtained by multiplying the pitch diameter of the gearwheel $D_p$ (a pitch circle 8 having a diameter $D_p$ corresponds with said pitch line 4 when the belt is involutely coiling round the gear) by $\cos\phi$. In this calculation, naturally, $D_p$ and $P$ must be selected so that $\pi D_p = n \times P$, where $n =$ integer and $P =$ pitch of teeth.

The thus determined tooth form is naturally a totally dedendum one in which the tooth extends to the inside of the pitch circle, that is, in the direction of the root of the tooth alone. During the engagement of the teeth of a rectilinear rack and a corresponding involute spur gear, it is also impossible to avoid a mutual sliding between the surfaces of the teeth. In a pair of involute spur gears the intermeshing slide attains a maximum at the tooth top of the larger gear, while in the combination of a rack and an involute spur gear it reaches a maximum at the tooth top of the rack. Similarly, in the engagement of the positive belt and gear whose forms are determined as described above, sliding occurs to cause wear of the teeth on the belt (and such wear reaches a maximum at the tooth top). Thus the life of the belt will be prolonged if such sliding is reduced.

The distribution of the tensile force in the engagement of the positive belt and gearwheel may be considered approximately by combining a theory as to the distribution of the engaging tensile force between a roller chain and sprocket and a theory as to the distribution of the contact fractional tensile force between a flat belt and pulley. That is, the relationship between a flat belt and pulley will be applied in the zone between the belt and pulley, while the relationship between the roller chain and sprocket will be applied in the zone between the teeth of the belt and of the gearwheel.

Figure 4:
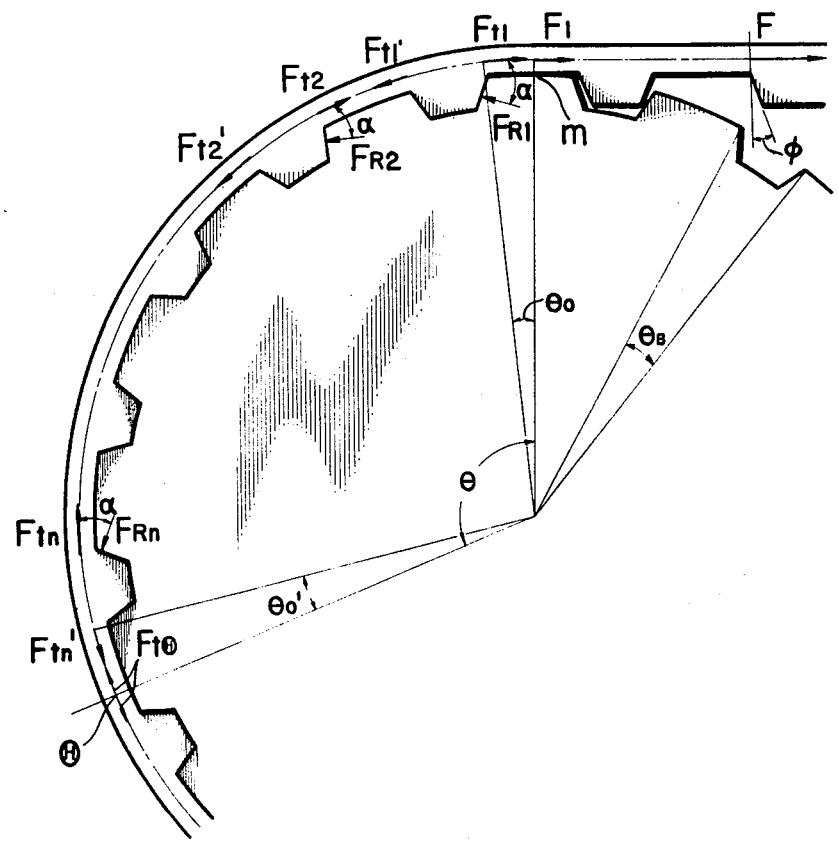
FIG. 4 is an enlarged view illustrating the distribution of the engagement tensile forces between the belt and gearwheel.

With the assumption that, as shown in FIG. 4, the tensile force on the tension side of the belt is $F_1$ and the belt and the gearwheel come into engagement at point $m$, the following equations will be obtained:

I. With respect to the distribution of tensile force on the belt, the tensile force $F_t \text{ⓜ}$ at point ⓜ is expressed as:

$$F_t \circledR = \left[\frac{\sin \alpha}{\sin (\alpha+\theta_B)}\right]^n \cdot \frac{F_1}{c^{\left\{\mu(n-1)\left(\frac{2\pi}{N}-\theta_B\right)+\theta_0+\theta'_0\right\}}} \quad (1)$$

II. The tooth form reaction $F_{Rn}$ exerted by the $n$th tooth of the engaging gearwheel is expressed as:

$$F_{Rn} = \frac{\sin \theta_B}{\sin (\alpha+\theta_B)} \left[\frac{\sin \alpha}{\sin (\alpha+\theta_B)}\right]^{n-1} \cdot \frac{F_1}{c^{\left\{\mu(n-1)\left(\frac{2\pi}{N}-\theta_B\right)+\theta_0\right\}}} \quad (2)$$

where $\alpha$ (an intermeshing pressure angle of the pulley cut by a gear cutter having a pressure angle $\phi$, $\theta_B$, $\theta_0$ and $\theta'_0$ are as shown in the drawing; $N=$ the number of teeth on the gearwheel; $\mu=$ coefficient of friction between the gearwheel and belt; $n=(D(\theta-\theta_0-\theta'_0)/2p)$; $p=$ pitch; and $D=$ outside diameter of the gearwheel. (Note: $n$ must be an integer with any decimal fractions being raised to unit).

From the above equations (1) and (2), it follows: pp
I. that the tensile force on the belt is reduced sharply, under the influence of geometrical damping, with an increase in the number of the engaged teeth from the point at which engagement starts and, under the influence of logarithmic damping, with an increase in the friction angle. The tensile force on the positive motion belt changes at every pitch;

II. that the reaction force on the tooth of the gearwheel, like the tensile force on the belt, changes from one tooth to another, decreasing with an increase in the number of the engaged teeth;

III. that the reaction force on the tooth increases with an increase in the tooth clearance angle $\theta_B$ in the outer diameter of the gearwheel, and when $\theta_B=0$ it coincides exactly with the equation of the distribution of frictional tensile force in a flat belt employed in power transmission by a flat belt and pulley; and IV. that, when the coefficient of friction $\mu=0$, it coincides with the equation of the distribution of tensile force in a roller chain in which the tooth clearance angle $\theta_0$ in the outer diameter of the gearwheel is adopted as an intermeshing angle of bend.

From the above facts, it has been found that in the engagement between the addendum-toothed positive belt and the dedendum involute gearwheel, the pitch of the teeth on the belt changes in accordance with the distribution of tensile force and it is desirable to make the teeth on the belt thicker to activate the engaging reaction force of the gear teeth positively.

In a power transmission system using a positive belt with elastic teeth, it is therefore very essential in order to increase the power transmission capacity and to improve the life of the belt to reduce the sliding during the belt's engagement with the gearwheel and to increase the thickness of the teeth on the belt as much as possible, and, at the same time, to improve the accuracy with which the belt can be manufactured.

Figure 5:
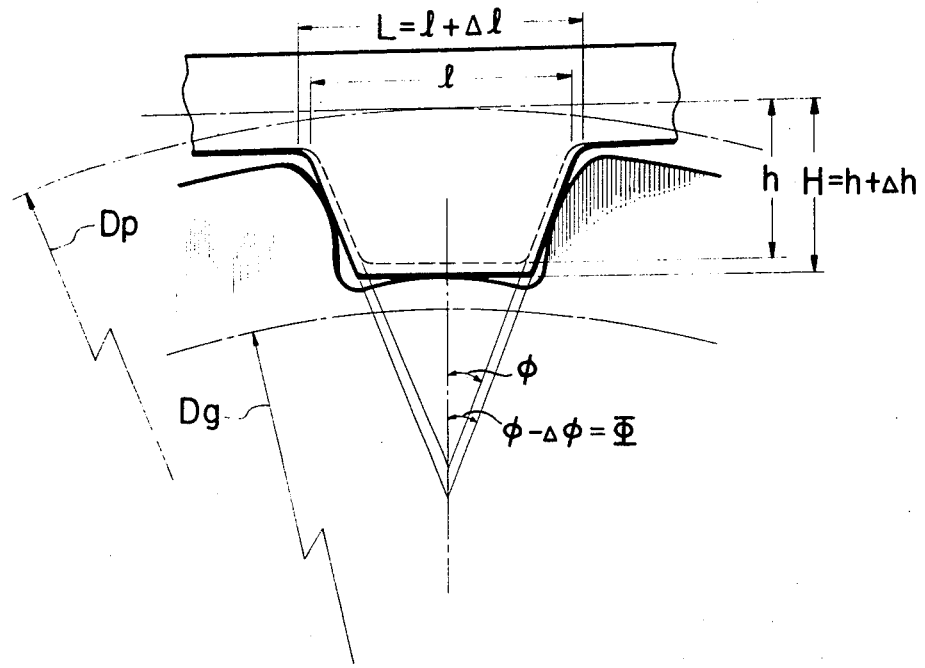
FIG. 5 is an enlarged fragmentary view illustrating the relationship between the tooth form of the gearwheel according to this invention and the gear cutter and the belt.

Thus this invention proposes to cut each cavity or tooth of the gearwheel which engages the belt by a rectilinear tooth cutter which has the following pressure angle $\Phi$ and tooth thickness $L$ and height $H$, as shown in FIG. 5, when the pressure angle, tooth thickness and height on the positive motion belt are $\phi$, $l$ and $h$, respectively:

Pressure angle $= \Phi = \phi - \Delta\phi = \phi - (0.3° \sim 5.0°)$
Thickness of tooth $= L = l + \Delta l = (1.01 \sim 1.08)l$
Height of tooth $= H = h + \Delta h = (1.05 \sim 1.15)h$.

In the above equations, the modification values $\Delta\phi$, $\Delta l$ and $\Delta h$ are determined as necessary by the pitch of the teeth on the belt, Young's modulus and the number of the teeth on the gearwheel.

The tooth form generated by such a tooth cutter made up for the drawbacks of the aforesaid power transmission positive belt and offers the following advantages:

1. By making the pressure angle of the cutter smaller than that of the tooth on the belt, the slide occuring during the engagement or disengagement of the belt with the gearwheel is reduced and the wear life of the belt can thereby be prolonged.

2. By increasing the thickness of the tooth of the tooth cutter, the cavity or tooth cut by it has such a form as to leave a clearance when it engages with the belt, and it can thereby prolong the life of the belt through the adsorption of a variation in the pitch of the belt. In addition, an increase of the tooth height of the tooth cutter will result in a reduction in the sound of air explosion caused by the movement of air during an engagement of the gearwheel by the belt during a high-speed transmission.

3. Being the generating type tooth form based on the tooth cutter, the tooth cutting cost can be reduced remarkably.

4. It improves the absorbability of errors in manufacturing the belt.

A formula will be derived that represents tooth form 7 of a timing pulley or gear 2 or 3 cut by a generating process employing a rectilineal-tooth-formed gear cutting tool 11 having a pressure angle $\Phi$, tooth thickness $L$ and tooth height $H$ as defined above.

Figure 6:
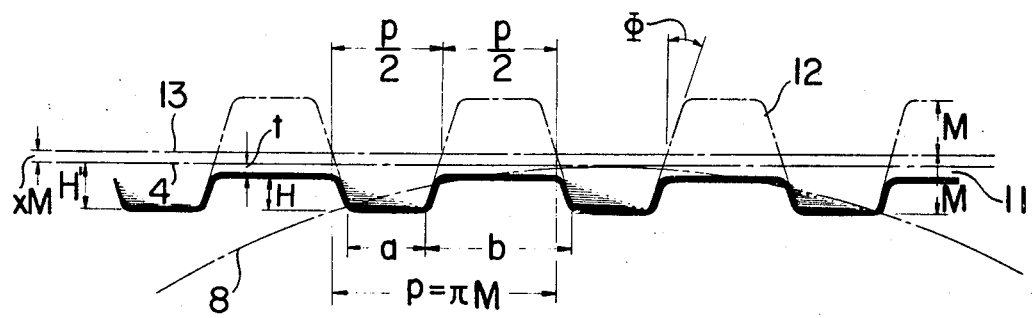
FIG. 6 is an enlarged fragmentary view illustrating a standard gear-cutting rack being used as a cutting tool for forming the teeth and cavities of the timing pulley according to the present invention.

FIG. 6 shows a standard gear-cutting rack 12 by a dot-dash line that serves as the cutting tool 11 for the pulley, wherein reference numeral 4 designates the pitch line of the timing pulley gear cutting tool 11, 8 the pitch circle of the timing pulley and 13 the center line of the standard gear cutting rack. When cut by the generating process with the standard gear-cutting rack 12, the timing pulley will generally have the tooth form of a profile shifted gear. The coefficient of profile shift $x$ will be obtained in the following manner:

Assuming that:
$p = \pi M$, where $p$ is the pitch of the rack
$a = $ thickness of the rack's tooth top
$b = p - a$
$H = $ tooth height of the rack for the timing pulley
$H' = $ depth from the pitch line to the bottom land of the rack for the timing pulley
$t = H' - H$
$M = $ module of the rack
$\Phi = $ pressure angle of the rack
Then
$a + 2(H' + xM)\tan\Phi = p/2$
$\therefore H + t + xM = (p/2 - a)/2\tan\Phi$
$\therefore xM = 1/2\tan\Phi [(p/2) - a] - H - t$ As will be understood from the above, the timing pulley will have a tooth form generated by the standard gear-cutting rack with a module $M = p/\pi$ (not necessarily a round number), with the following amount of profile shift $xM$:

$xM = 1/2\tan\Phi [(\pi M/2) - a] - H - t$

The tooth form 7 of the timing pulley thus generated is involute. Then, a formula representing the space angle $\chi$ in the base circle and the tooth height will be derived.

Figure 7:
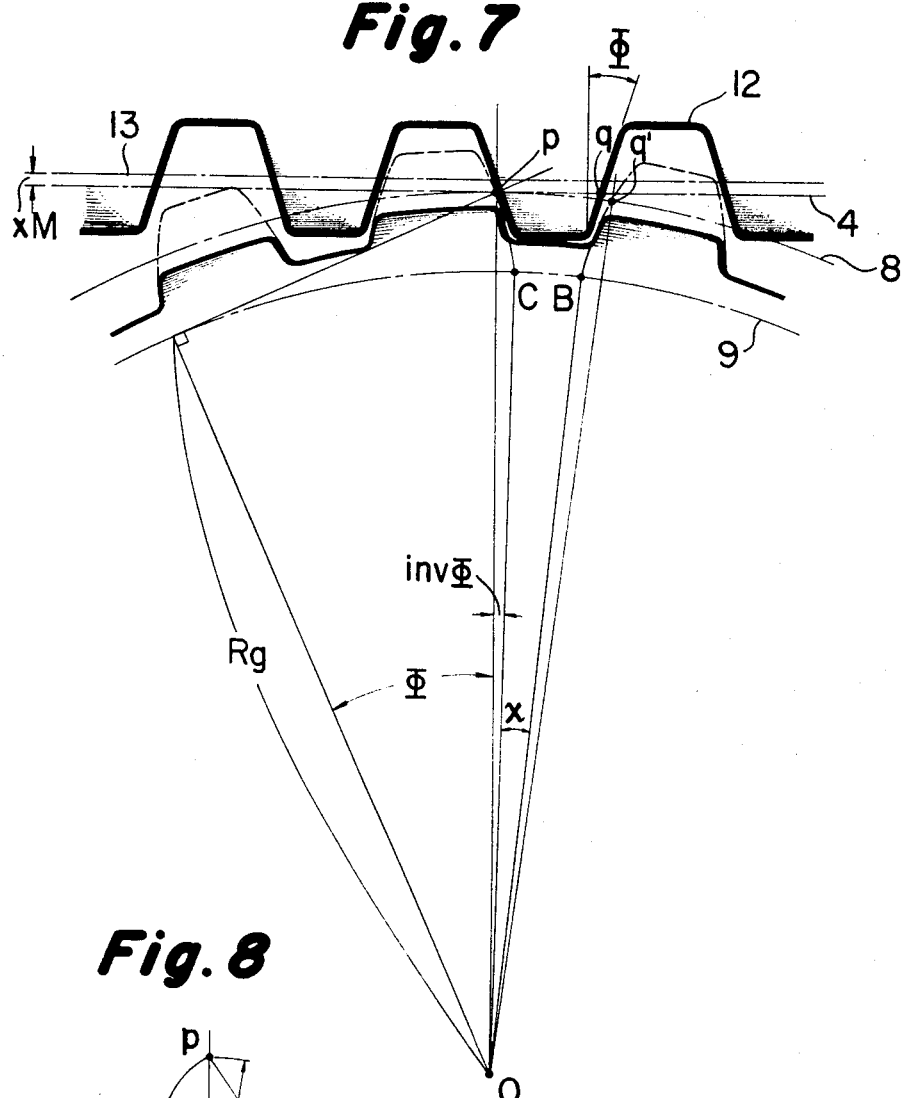
FIG. 7 is a view similar to FIG. 6 and illustrating the generated timing pulley.

FIG. 7 shows the generated timing pulley by a solid line. Since the pitch line 4 of the rack 12 and the pitch circle 8 of the gear are to move without sliding, circular arc $\widehat{pq'}$ is equal to distance $\overline{pq}$. On the other hand, since the rack has a width of $\pi M/2$ when cut along its center line, the following equation can be obtained:

$$\widehat{pq'} = \overline{pq} = (\pi/2 - 2x\tan\Phi)M \quad \text{(a)}$$

At the same time, since $<poq' = 2 < poc + \chi$ and the diameter of the pitch circle is $ZM$ ($Z$ = number of the pulley's teeth), it follows that:

$$\widehat{pq'} = (ZM/2) \cdot <poq' = Z[\text{inv}.\Phi + (\chi/2)]M \quad \text{(b)}$$

From equations (a) and (b), the space angle $\chi$ in the base circle is expressed as follows:

$$\chi = \pi/Z - 2\text{inv}.\Phi - 4\tan\Phi/Z \cdot x$$
$$= \pi/Z - 2\text{inv}.\Phi - 4\tan\Phi/ZM \{1/2\tan\Phi(\pi M/2 - a) - H - t\}$$

Figure 8:
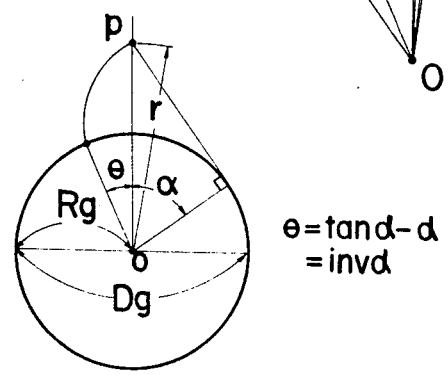
FIG. 8 illustrates the curvilinear coordinates applicable to the timing pulley of the present invention.

As already described, the timing pulley has the tooth form represented by an involute curve derived from the base circle $Dg = Dp \cos\Phi$. The involute curve is expressed as follows on the curvilinear coordinates $(r,\theta)$, as shown in FIG. 8:

$$r = Rg \cdot \sec\alpha = Rg \cdot \sec(\text{inv}.^{-1}\theta)$$
$$= Rg \cdot ev\theta = (Dg)/2 \cdot ev\theta,$$

where $ev$ is called the Evolvens function.

Finally, the tooth height of the timing pulley becomes equal to the tooth height $H$ of the rack 11.

Thus, the gear tooth form according to the present invention can be determined by the foregoing formula when the base circle ($Dg = Dp \cos\Phi$), space angle in base circle $\chi$ and tooth height $H$ are fixed.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Improvement in a cavity or tooth form of a gearwheel engaging a rectilinearly toothed positive belt in a power transmission device, with said positive belt having elastic rectilinear teeth, characterized in that the gearwheel teeth are generated by a rectilinear tooth cutter having a pressure angle $\Phi$ and an effective tooth thickness $L$ and a height $H$ of the following value when a tooth on the positive belt has a pressure angle $\phi$ and an effective tooth thickness $l$ and a height $h$:

$$\Phi = \phi - (0.3° \sim 5°)$$
$$L = (1.01 \sim 1.08)l$$
$$H = (1.05 \sim 1.15)h$$

2. In a positive motion belt transmission, a belt having rectilineal elastic teeth and a timing pulley having rectineal teeth engaged with the belt, the teeth of the belt having a pressure angle $\phi$, an effective tooth thickness $l$ and a tooth height $h$, the teeth on the timing pulley being generated by a rectilineal tooth-formed gear-cutting tool having a pressure angle $\Phi$, an effective tooth thickness $L$ and a tooth height $H$ defined by the following values:

$$\Phi = \phi - (0.3° \text{ to } 5°)$$
$$L = (1.01 \text{ to } 1.08)l$$
$$H = (1.05 \text{ to } 1.15)h$$

said values being based on a curve derived from the following formulae:

1. Space angle $\chi$ in base circle ($Dg = ZM\cos\Phi$):

$$\chi = \pi/Z - 2\text{inv}.\Phi - (4\tan\Phi/ZM) \{(1/2\tan\Phi)(\pi M/2) - a) - H - t\}$$

2. Involute curve:

$$r = (Dg/2) \cdot ev\theta = (ZM\cos\Phi/2) \cdot ev\theta$$

where
- $r$ = a radius distance from the center of the pulley to the involute tooth-form line
- $\theta$ = an angle formed by a line connecting the starting point of the involute curve on the base circle to a point on the involute curve on radius $r$ and the center of the pulley 3. Tooth height of the pulley = $H$ where
- $M$ = module of the rack
- $Z$ = number of the pulley's teeth
- $H'$ = depth from the tool's pitch line to the bottom land
- $t = H' - H$
- $a$ = thickness of the tool's tooth top

* * * * *